Figure 1:
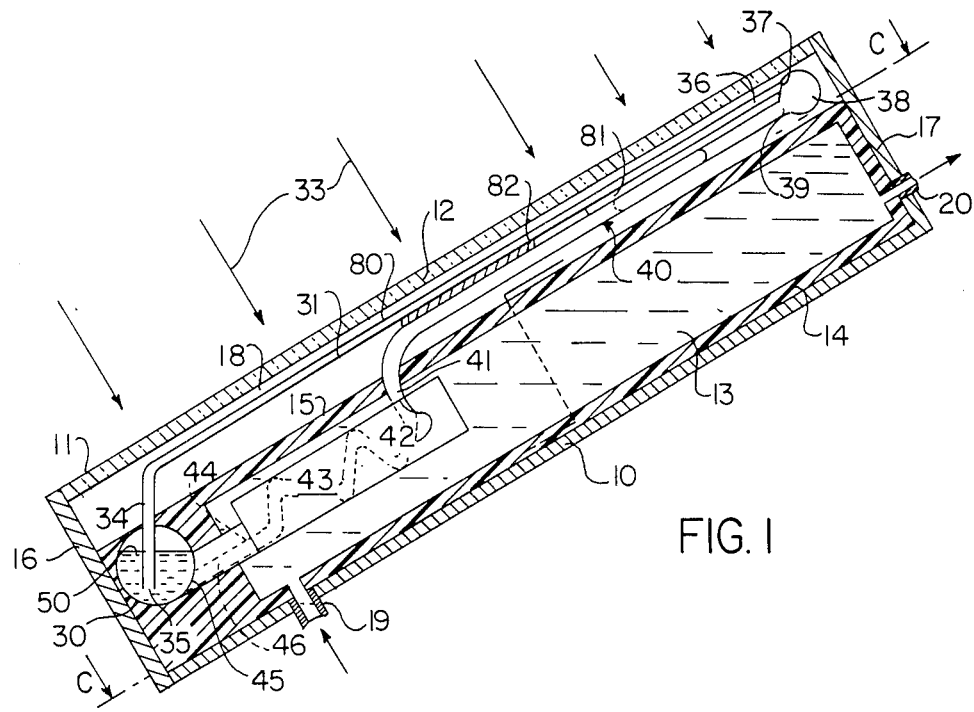

United States Patent [19]

Vironneau et al.

[11] Patent Number: 4,619,243
[45] Date of Patent: Oct. 28, 1986

[54] APPARATUS FOR THE CAPTURE AND TRANSFER OF RADIATION ENERGY SUCH AS SOLAR RADIATION

[76] Inventors: Pierre Vironneau, 2, Rue Jean-Moulin, 31120 Portet-sur-Garonne; Jean Prunet, Domaine de la Terrasse, 31450 Montgiscard, both of France

[21] Appl. No.: 748,614

[22] Filed: Jun. 25, 1985

[30] Foreign Application Priority Data

Jun. 25, 1984 [FR] France .................................. 84 10563

[51] Int. Cl.$^4$ ................................................ F24J 2/32
[52] U.S. Cl. ..................................... 126/433; 126/435; 126/422; 126/450; 165/104.21
[58] Field of Search ............... 126/433, 434, 435, 448, 126/432, 422; 165/104.21, 104.22, 104.29

[56] References Cited

U.S. PATENT DOCUMENTS

| | | | |
|---|---|---|---|
| 3,390,672 | 7/1968 | Snelling | 126/433 |
| 4,003,367 | 1/1977 | Wikholm | 126/434 |
| 4,010,734 | 3/1977 | Chayet | 126/422 |
| 4,050,508 | 9/1977 | Buckley | 126/434 |
| 4,428,362 | 1/1984 | Larkin | 126/434 |
| 4,527,545 | 1/1985 | Bertels | 126/433 |

FOREIGN PATENT DOCUMENTS 72844 4/1983 Japan ..................................... 126/434

Primary Examiner—James C. Yeung
Attorney, Agent, or Firm—Young & Thompson

[57] ABSTRACT

Solar heat is transferred to water by a relatively volatile liquid that flows in closed circuit. The water is thermally insulated from the sunlight. The volatile liquid is drawn by a thermosiphon effect through passageways exposed to the sunlight, and then through passageways shielded from the sunlight but in the same chamber as the passageways exposed to the sunlight, before proceeding to indirect heat exchange with the water and back to the reservoir of volatile liquid. A siphon loop in that shielded portion of the path, ensures that when there is no sunlight, the condensation in the conduits that were previously exposed to the sunlight will not cause reverse flow in the circuit.

7 Claims, 2 Drawing Figures

APPARATUS FOR THE CAPTURE AND TRANSFER OF RADIATION ENERGY SUCH AS SOLAR RADIATION

The present invention concerns apparatus for the capture and transfer of energy, more particularly apparatus or collectors called solar which permit the capture of energy provided by solar radiation.

There is known already an apparatus comprising essentially two circuits, a primary circuit and a secondary circuit, the primary circuit being adapted to be traversed by a volatile liquid which is able to change its phase very readily.

One such apparatus has already been described in a number of references. It essentially comprises an absorber constituted for example by a plurality of channels adapted to the type of solar collector situated one next to the other under a window formed from a material which is transparent with respect to the radiation from which it is necessary to capture the energy. The energy thus radiated is absorbed by these generally blackened channels and collected by a fluid passing through these latter, this fluid being constituted by a volatile liquid for which phase changes occur very readily.

The apparatus also comprises heat transfer means arranged to receive the energy collected by the absorber and for the transfer to a secondary fluid circulating, for example, in the interior of a storage chamber in which are immersed heat exchange means, as for example a coil, with small tubes connecting the channels to these heat exchange means.

The apparatus comprises also, it will be understood, a reservoir for this volatile liquid which is generally placed, when the apparatus is in operation, below the plane of the absorber and in communication, on the one hand with this latter by means of conduits, for example constituted of one or of a plurality of channels connected to the lowermost points of the absorber and dipping into the liquid contained in this reservoir, preferably constantly underneath its lowermost level in this reservoir, and on the other hand with heat exchange means for the outflow means which may be formed of one or several channels, which are arranged to open into the reservoir which is also disposed below the lowermost point of these heat exchange means, during the functioning of the apparatus.

Finally, the apparatus also comprises piping means formed essentially of a collector connecting the highest points of the channels constituting the absorber to the heat exchange means.

Thus, the reservoir, the conduit means, the absorber, the piping means, the heat exchange means and the return means form a closed circuit in which is arranged to circulate the volatile liquid in some phase which may be either vapor phase, liquid phase, or in both liquid and vapor phase at the same time, according to the process described hereinafter.

Under the effect of solar radiation, at the beginning if the diurnal period, the absorber and the reservoir are at that time heated to a temperature higher than that prevailing in the heat storage chamber, so that the volatile liquid contained in this reservoir begins to boil and rises in the channels of the absorber under the effect, on the one hand of the growing suppression of the gas contained and confined above the level of the liquid in the reservoir, and on the other hand of a certain entrainment of the liquid by the gaseous bubbles formed at the moment of boiling. After a certain operating time, the circulation is primed in the primary circuit. This circuit is at that time the threshold of a reduced pressure created by the condensation of the gas when this latter reaches the coldest parts of the circuit, that is to say essentially the heat exchange means. After priming, the volatile liquid which rises in the channels of the absorber undergoes a very significant heating under the effect of the solar radiation irradiating the receiving surface of the absorber. The liquid is then vaporized instantaneously, so that the vapor formed and aspirated, always under reduced pressure, across the piping means toward the heat exchange means is condensed to transmit calories to the secondary fluid contained in the enclosure. The condensate of this primary fluid then returns to the liquid state toward the reservoir across the outflow means. The cycle thus continues so long as the radiation persists. In the course of this cycle, the volatile liquid which readily changes phase retains by evaporation the calories of the solar radiation absorbed by the channels of the absorber and transfers them, at the time of the condensation, to the liquid of the secondary circuit in the heat exchange means.

Such an apparatus is of a very great efficiency due to the importance of the latent heat of vaporization of the primary liquid and does not require the presence in its primary circuit of mechanical or electrical parts to obtain this transfer of calories.

It is to be noted that the reservoir is disposed below the lowest point of the heat exchange means and that the primary circuit contains a quantity of volatile liquid such that the level of this liquid in the entirely condensed state is situated lowest in the heat exchange means, to try to avoid an inverse cycle during cold periods, that is to be say, for example during the nocturnal periods. However, in nocturnal periods, as the heat exchange means may then be found at a temperature higher than that of the absorber, a part of the volatile liquid may have a tendency to rise by vaporization across the heat exchange means where the vapor would be condensed in the conduits, the collector and the channels.

The present invention has for an object to overcome these disadvantages. It also has as an object to realize an entirely static apparatus which permits avoiding, in nocturnal periods, a cycle of reverse functioning to that of the diurnal cycle, and thus to avoid a dissipation of calorific energy which would have been stored during the diurnal periods.

More precisely, the present invention has for an object an apparatus for the capture and the transfer of radiation emitted in a non-continuous manner, characterized by the fact that it comprises:

a first circuit called the primary circuit adapted to be traversed by a first liquid having a substantial quality of volatility, this said primary circuit comprising, assembled in series, on the one hand a reservoir for the said first fluid in the liquid phase and channels adapted to be submitted to the said radiation and to take on at least two temperatures t1 and t4 acccording to the presence or absence of radiation, respectively, t4 being defined as less than t1, and on the other hand by a recovery conduit, a second circuit called the secondary circuit adapted to be traversed by a second fluid, this said secondary circuit being substantially thermally isolated, a fluidic heat exchanger of at least a first and a second path, the first path being mounted in series in the said recovery conduit, and the second path in the said secondary circuit, such that the said secondary fluid is introduced to a temperature t2, t2 being adapted to be comprised between t1 and t4, when the said channels submitted to the radiation are introduced to the temperature t1, and means to maintain the part of the said recovery channel mounted between the said channels and the said first path of the exchanger at a temperature t3, having a value comprised between t2 and t4.

Figure 2:
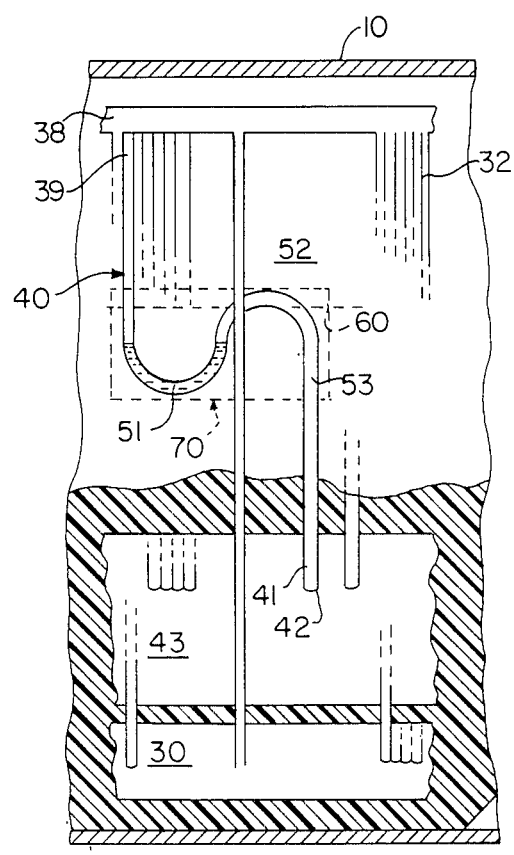

Other characteristics and advantages of the present invention will become apparent by way of the following description given with regard to the accompanying drawings of an illustrative but by no means limiting example, in which:

FIG. 1 shows, in longitudinal view and in partial section, an embodiment of the apparatus according to the invention, and FIG. 2 shows in partially simplified view from above along the line C—C of FIG. 1, the embodiment of the apparatus according to this same FIG. 1.

Two two figures show a same embodiment, the same reference numerals show the same elements and, consequently, for the understanding of the present description, it will be necessary to refer indifferently to the one or the other of the two figures, depending on which shows the designated elements in a visible manner.

The apparatus for the capture and transfer of radiation energy illustrated in FIGS. 1 and 2 comprises a housing 10 of which one of the sides 11 is closed by a wall 12 formed of a transparent material according to the wavelength or wavelengths of the radiation of which it is necessary to capture the energy.

In the case of solar radiation, this material will be essentially constituted by a glass window. The housing 10 contains an enclosure 13 immersed in an insulating material 14 the upper surface 15 of which delimits with the two lateral sides 16 and 17 of the housing 10 a tight or relatively tight space 18 which can eventually be filled with a neutral gas such as nitrogen. It will be understood that this enclosure 13 comprises an inlet 19 for a fluid such as, for example, water and an outlet 20 for this same fluid. This part of the circuit comprised between the inlet 19 and the outlet 20 constitutes a second path for a heat exchanger. In a normal position of operation, the inlet 19 is generally situated at a low point while the outlet 20 is situated at a higher point. This enclosure 13 is adapted to be traversed by a fluid such as, for example, water. At the inlets 19 and 20 are generally connected in series or in parallel elements of a circuit called the secondary circuit which are, for example, water heaters, radiators or any other analogous elements which can use the calories which will be recovered by this fluid.

The apparatus illustrated additionally comprises a reservoir 30 for a very volatile fluid, such as for example a refrigerating agent or mixture of refrigerating agents such as the product known under the commercial name of Freon, or ethyl chloride, ammonia, alcohol, etc. This reservoir 30 is partially insulated particularly by the material 14 insulating the enclosure 13. With this reservoir 30 are associated channel means 31, advantageously of a plurality forming a sheet 32 disposed just beneath the window or the transparent wall 12, in such a manner as to be able to receive all the radiation 33 falling on the channels and having passed through this window 12. As is well known, these channels, and more particularly their surface 80 turned toward the transparent wall 12, are covered with a product favoring the absorption, as for example a black coating, thus permitting a maximum absorption of the radiation.

An extremity 34 of these channels 31 dips slightly into the bottom 35 of the reservoir 30, nevertheless clearly and always underneath of the level 50 of the liquid contained in this reservoir 30. The other extremity 36 of these channels is connected to an inlet 37 of a collector 38 comprising an outlet 39. This outlet 39 is connected to a recovery conduit 40 having a section which is generally greater than that of the channels 31, thereby permitting a freer outflow of the fluid, as will be explained hereinafter. The other extremity 41 of this recovery conduit 40 is connected to the inlet 42 of a first path 43 of a heat exchanger of which the second path is constituted by the enclosure 13. This first path may be constituted for example by a coil immersed in the liquid contained in the enclosure 13. The outlet 44 of this path 43 of the heat exchanger is connected to an inlet 45 of the reservoir 30. In this manner, the reservoir 30, the assembly of channels 31, the collector 38, the recovery channels 40, the first path 43 of the heat exchanger and the collector 46 connecting the path 43 of the heat exchanger to the reservoir 30 constitute a closed circuit called the primary circuit, adapted to be traversed by the fluid contained in the reservoir 30 in a form that is liquid and/or gaseous.

As previously mentioned, the apparatus illustrated in FIGS. 1 and 2 should normally be utilized such that the reservoir 30, and particularly the liquid which it contains, and more particularly its level 50, are situated underneath the lowest point of the path 43 of the heat exchanger and at the occurrence of its outlet 44. Similarly, the assembly of the outlet elements of the extremities 36 and of the collector 38 are situated at a higher point.

According to the embodiment of the apparatus, the recovery conduit 40 should be associated with means for maintaining it at a certain temperature determined as will be described hereinafter. In an advantageous embodiment, the conduit 40 is situated just behind the sheet 32 of channels 31 with respect to the transparent window 12, and more particularly in the space delimited between this sheet 32 and the surface 15 of the isolating casing of the enclosure 13. This conduit 40 should also be, at least partially, in thermal contact 82 with the back surface 81 of the sheet 32 of channels 31. In all cases, this recovery conduit 40 will be very advantageously formed of a material of low thermal conductivity.

Moreover, according to an additional very advantageous characteristic, the recovery conduit 40 comprises in series a siphon 70. Under these conditions, the recovery conduit 40 forms in an oblique plane at least two curved portions 51 and 52 to form the siphon 70, so that a portion, in practice the portion 51, might retain liquid and that this latter rests in the conduit 51 at least up to the level 60. On the other hand, if this level is attained, the fluid in excess runs off in the part 53 of the recovery conduit 40 to return to the reservoir 30 while eventually passing across the exchange means 43 immersed in the enclosure 13.

In one general method, this heat exchanger constituted by the first path 43 and the second path, at the occurrence of the enclosure 13 insulated by the material 14, constitutes an exchanger of at least two parallel paths. These thermal exchangers are well known in themselves, and all fluid traversing the one of these paths permits transfer of the calorific energy to the fluid traversing the second path, and reciprocally, according to the relative value of the temperatures of the fluid traversing these two paths. They will therefore not be further described.

The apparatus which has been described hereinabove with regard to FIGS. 1 and 2 functions in the following manner:

From the very first, it is assumed that there is present radiation 33, for example diurnal solar radiation. In this case, the channels 31 are heated, as well as the reservoir 30 which is not specially totally thermally isolated, to a temperature t1 which is certainly greater than the temperature of the fluid contained in the enclosure 13 which is considered at the temperature t2 generally inferior to t1. In this way, the volatile liquid which is found in the reservoir 30 begins to boil and rises in a generally two-phase form, vapor and liquid, in the channels to arrive at the level of the collector 38 totally in the vapor phase. This rising in the channels 31 is essentially due to the overpressure prevailing in the reservoir, above the level 50, which grows in proportion to the heating on the one hand, and on the other hand to the reduced pressure resulting from the condensation of the gas in the exchanger 43, these differences of pressure being the driving force for the circulation phenomenon.

By virtue of the natural inclination of the conduit 40, the liquid thus reoccurring returns to the reservoir 30. It will be understood that there exists a time constant for which the above-described process is stabilized in a continuous manner. If the radiation is considerably sustained, the heat exchanges become sufficiently elevated that the temperature t2 of the liquid contained in the enclosure 13 increases in a substantial manner. However, it is evident that this temperature will always be less than t1, whatever that value may be.

If, now, it is assumed that the radiation 33 ceases, as for example during the nocturnal periods, the channels automatically become chilled and returned to a temperature t4. The value of this temperature may descend to values of temperatures that are very cold, as for example during the nocturnal periods of winter. However, as the container 13 is thermally insulated, and generally relatively also the secondary utilization circuit, the fluid contained in this reservoir maintains its temperature t2, the same if it varies to a value greater than the value of t4. In this case, this source of relative heat that constitutes the enclosure 13 with its fluid may produce a volatilization of the liquid contained in the reservoir 30, which will entrain a cycle in the opposite sense to that previously described, that is to say a rising of the volatile liquid in the first path 43 of the exchanger eventually in the form of vapor, and this latter being recondensed in the channels 31 to return to the reservoir 13, being drawn off by the extremity 34 of the channels 31. The result of this phenomenon, if it occurs, will be a transfer of calories from the liquid of the secondary circuit toward the primary circuit, and thus toward the ambient atmosphere. This is altogether inconceivable for such an apparatus, as the value of the total output is lowered in not using the thermal inertia of the fluid of the secondary circuit and would not, for this reason, continue the use during the absence of radiation.

To overcome this disadvantage, the recovery conduit 40 which has been described above is submitted to means for maintaining a temperature t3 which is comprised between the temperature t4 and t2 defined as above. These means are, from the very first, in this advantageous embodiment made to dispose this recovery conduit behind the channels 31 which are in continuous layers with respect to the ambient air. The conduit 40 is thus at the teperature t3 which is, in these conditions, greater than t4.

This has as a result that the vapors which are produced in the first path 43 of the exchanger are then condensed in this recovery conduit 40, this latter having at least one siphon 70 as illustrated, and equally advantageously, a plurality of siphons, which may thus gather, during the beginnings of the reversion of the phenomena when the temperature of the channels passes from t1 to t4, a part of the recondensed liquid, as it appears in the elbow 51, to form at that time, for the eventual ulterior vaporizations, a liquid stopper formed naturally without addition of any exterior element to the apparatus.

In an advantageous form, the siphon 70 will be situated between the channels 31 and the inlet 42 of the exchanger, to prevent as much as possible the vapor produced unintentionally, as described above, from escaping from the exchanger.

These characteristics described and illustrated of the apparatus according to the invention display all the advantages which accrue to such an apparatus which has a very elevated efficiency for a lower cost, comprises only few elements and, furthermore, these latter are entirely static.

It should moreover be stated precisely that these different characteristics do not harm in any way the functioning of the cycle described previously in the presence of radiation. In effect, the radiation which heats the channels will also sufficiently heat the recovery conduit 40 to vaporize the liquid contained in the siphon 51.

We claim:

1. Apparatus for the capture and transfer of radiation emitted in a non-continuous manner, comprising:
    a first circuit, a first fluid having a quality of high volatility in said first circuit, said first circuit comprising, mounted in series, a reservoir of said first fluid in liquid phase and channels adapted to be subjected to said radiation to take on at least two tempertures t1 and t4 according to the presence or absence of radiation, respectively, t4 being less than t1, and a recovery conduit,
    a second circuit, a second fluid in said second circuit, said second circuit being substantially thermally insulated,
    a fluidic heat exchanger of at least one first and one second path, the first path being mounted in series in said recovery conduit, and the second path in said secondary circuit, in such a manner that said second fluid is brought to a temperature t2 between t1 and t4, when the said channels subjected to the radiation are brought to the temperature t1, and
    means for maintaining the part of the said recovery conduit mounted between the said channels and the said first path of the exchanger at a temperature t3 having a non-continuous value between t2 and t4.

2. Apparatus for the capture and transfer of radiation emitted in a non-continuous manner, comprising:

a first circuit, a first liquid having a quality of high volatility in said first circuit, said first primary circuit comprising, mounted in series, a reservoir of the said first fluid in liquid phase and channels adapted to be subjected to said radiation to take on at least two temperatures t1 and t4 according to the presence or absence of radiation, respectively, t4 being less than t1, and a recovery conduit, a second circuit, a second fluid in said second circuit, said second circuit being substantially thermally insulated, a fluidic heat exchanger of at least one first and one second path, the first path being mounted in series in said recovery conduit, and the second path in said secondary circuit, in such a manner that said second fluid is brought to a temperature t2 between t1 and t4, when the said channels subjected to the radiation are brought to the temperature t1, the portion of the recovery conduit comprised between said channels and the first path of the exchanger being situated in a same fluid medium as said channels and behind the said channels with respect to the surface of the said channels capable of receiving the said radiation.

3. Apparatus according to claim 2, in which said portion of the recovery conduit comprises in series at least one siphon.

4. Apparatus according to claim 2, in which said portion of the recovery conduit is formed of a material of low conductivity.

5. Apparatus according to claim 4, in which said portion of the recovery conduit has at least one wall portion in thermal contact with said channels.

6. Apparatus according to claim 3, in which said siphon is situated as near as possible to said first path of the heat exchanger.

7. Apparatus according to claim 3, in which said siphon is thermally insulated from said second circuit.

* * * * *